June 24, 1930.   R. A. MEYER   1,767,221
STRAINER
Filed Aug. 20, 1927   2 Sheets-Sheet 1
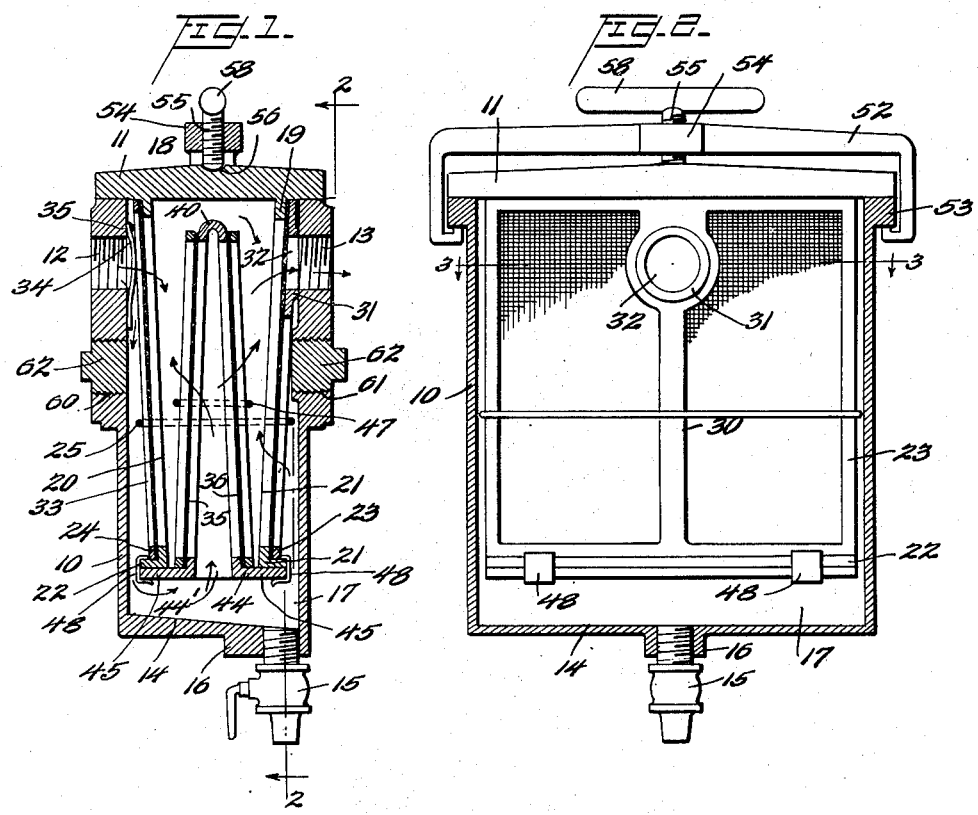
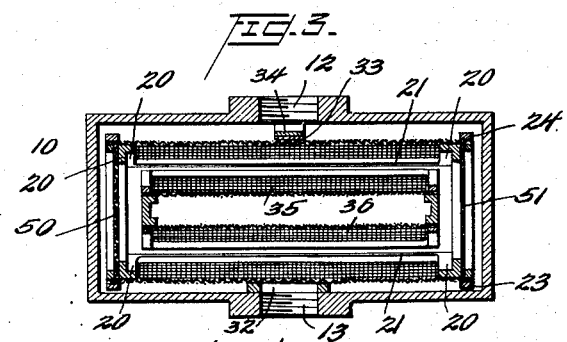
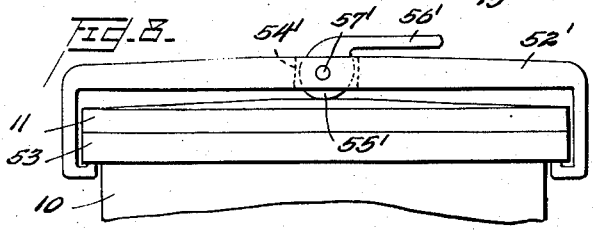

June 24, 1930.    R. A. MEYER    1,767,221
STRAINER
Filed Aug. 20, 1927    2 Sheets-Sheet 2
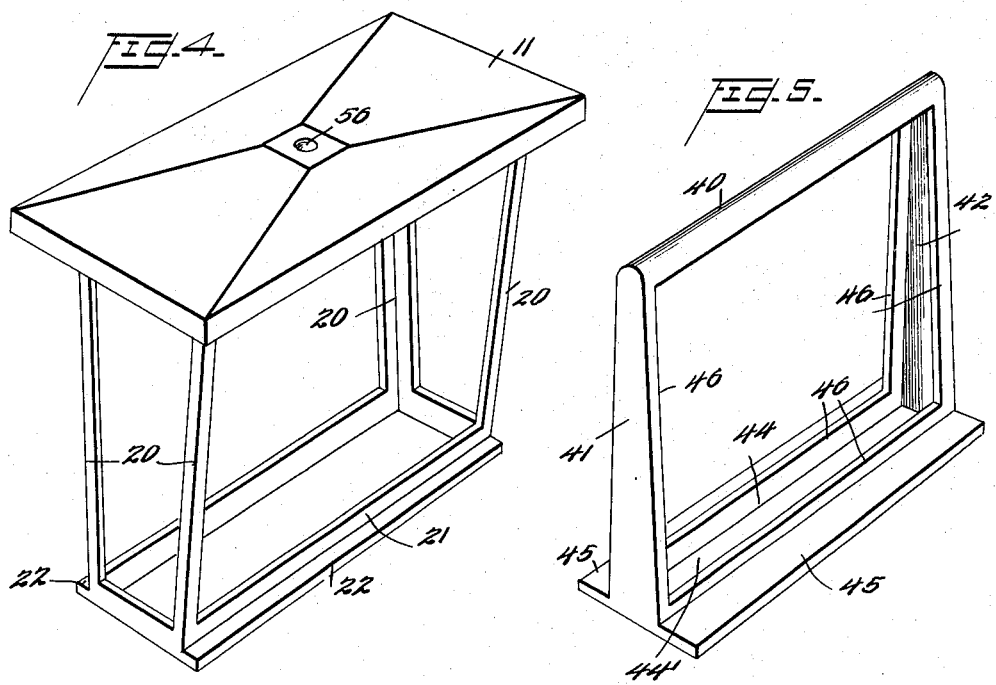
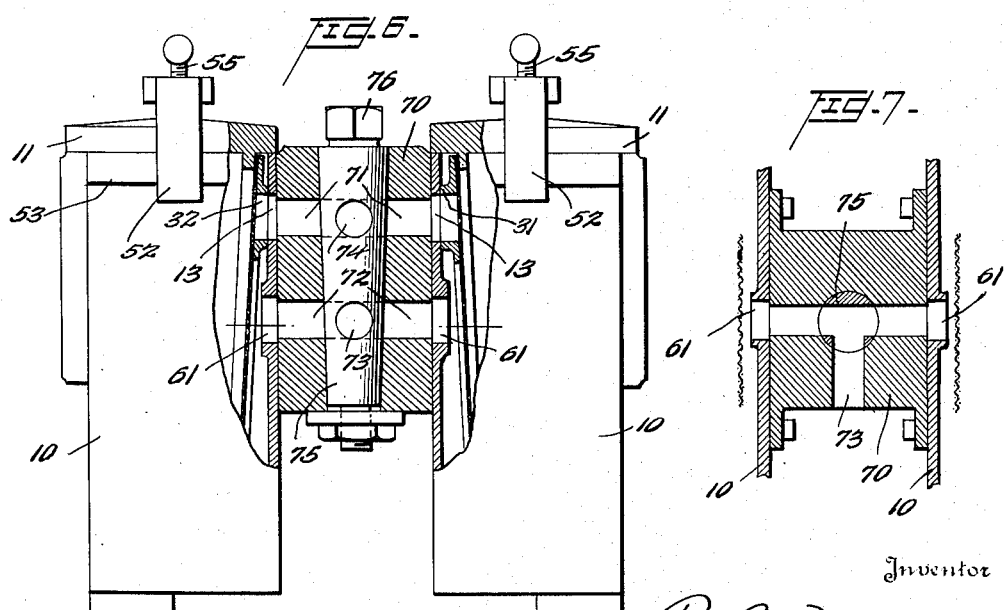
Inventor
R. A. Meyer,
By Watson, Coit, Morse
 + Grindle,
    Attorney Patented June 24, 1930

1,767,221

UNITED STATES PATENT OFFICE

RICHARD A. MEYER, OF NEW YORK, N. Y.

STRAINER

Application filed August 20, 1927. Serial No. 214,432.

This invention relates to strainers or filters for removing foreign material or solid matter from a fluid of any kind, but more particularly from the fuel and lubricating fluids used in connection with marine Diesel engines, such as fuel oil and lubricating oil.

Simple screen filters have been used heretofore in connection with the fuel and lubricating oils of Diesel engines, as well as other liquids of all kinds, but they have proven unsatisfactory for various reasons. One defect is that the ordinary strainer is not of sufficient efficiency to remove the finer particles of foreign matter, which soon clog up or otherwise impair the operation of the marine Diesel engine, or decrease the value of the filtrate of any kind. Other disadvantages are that in order to secure a filter of the desired capacity, and the necessary filtering area, a very bulky filter resulted, which is a fatal defect in marine practice and other uses where conservation of space is of importance. Rapidity of clogging and the difficulties in overhaul for cleaning also rendered these previous expedients entirely unsatisfactory.

Similar defects have been found in previous filters for various liquids, such as water, gasoline and all other liquids which require filtering. It is therefore the principal general object of my invention to simplify and improve the efficiency of filters which are used for removing foreign material from liquids of any kind.

It is another object of my invention to provide a large amount of filtering area within a small volume of filter container.

It is another object of my invention to arrange the screening material at an angle, to permit the foreign particles to fall off and thus prevent clogging of the filter.

It is a further object of my invention to simplify the container for the filter so as to permit simplicity of overhaul.

It is still another object of my invention to provide the filter casing with a plurality of inlets whereby different fluids may be filtered without disconnecting the piping.

Other objects and features of novelty will be apparent as the description proceeds, when taken in conjunction with the accompanying drawings in which:

Figure 1 is a vertical cross section through a filter constructed in accordance with my invention;

Figure 2 is a cross section taken along the line 2—2 of Fig. 1;

Figure 3 is a horizontal cross section taken along the line 3—3 of Fig. 2;

Figure 4 is a perspective view of the cover for the filter casing showing the screening framework secured thereto;

Figure 5 is a perspective view of the interior screen frame;

Figure 6 is an elevation partly in section showing an arrangement whereby two of the filters may be connected together, with a three way valve permitting the use of both or the cutting off of either;

Figure 7 is a horizontal cross section of a portion of the structure shown in Fig. 6, taken along the line 7—7 of that figure; and Figure 8 is an elevation of a modified form of clamp for securing the cover.

Referring more particularly to the drawings, my invention comprises a casing of rectangular or box-like form indicated generally at 10. The casing is open at its upper end, and receives a cover 11 which may be secured thereto in any desired manner. The closure may be a metal to metal contact as in the form shown but a gasket may be provided if desired.

The casing is provided with an inlet aperture 12 which is threaded to receive the inlet pipe, and an outlet aperture 13 in the opposite wall of the container is also threaded to receive the outlet pipe. The bottom of the casing is inclined as shown at 14 and forms a sump for the sediment which may be drained off through a drain cock 15 which is threaded in a boss 16 at the bottom of the casing.

The filtering material may be of any desired type such as various kinds of cloth, but it is preferably woven Monel metal wire which, depending upon the installation, may be of any desired mesh, as fine as 500 or even 1,000 meshes to the inch. This material is arranged to present a great number of rectangular filtering surfaces to the unfiltered oil. As shown in Fig. 1, the material is arranged in a zig-zag form, dividing the interior of the casing into two chambers. The lower chamber 17 which receives the unfiltered oil from the inlet 12 is separated by the screening material from the upper chamber 18 which receives the filtered oil to be discharged from the outlet 13.

The framework which supports the filtering material may be suspended or supported within the casing in any desired manner, but in the preferred form shown it is integral with the cover 11. The skeleton framework is best shown in Figs. 4 and 5, as it is preferably made up of two separate parts, although it may be made integral as desired. The top of the outer skeleton frame comprises a rectangular portion 19 which as shown in Fig. 1 is formed as a depending web from the cover 11. From each corner of the member 19, corner members 20 extend downwardly to meet the corners of the lower rectangular frame 21. The outer sides of the base member 21 are provided with horizontal flanges 22 which form seats for the rectangular frames 23 and 24 (Fig. 1) to which the screening material is secured. These frames may be permanently secured in place as by soldering, or the screening material may be soldered directly to the skeleton frame when it is made integral, but in the preferred form shown the frames are detachably secured by means of the rectangular wire ring 25 which is pushed up over the outside of the frames after they have been placed in position, clamping them securely in place, but permitting their ready disassembly by driving off the ring 25.

As shown in Fig. 2 the frame 23 has a central strengthening member 30 which is enlarged at its upper end forming a boss 31 in which an aperture 32 is provided and fitted so as to register with the outlet 13 as shown in Fig. 1. The frame 24 has a corresponding strengthening member 33, which has no boss structure but is of uniform cross section. The member 33 forms an abutment for the leaf spring 34 secured near the top of the casing as by a pin 35. This spring serves to center the framework when it is placed in position and also to hold it securely in place.

It will be noted that the base member 22 is much narrower than the upper member 19, hence the screens 23 and 24 are inclined downwardly, the purpose of which will be later described.

Between the screens 23 and 24 are positioned other screens 35 and 36, which are carried by the inner frame shown in Fig. 5. This frame comprises an upper ridge member 40 and substantially triangular end members 41 and 42 depending therefrom and widening toward their lower ends where they terminate in the base member 44. Laterally extending flanges 45 are integral with the base member, forming seats for the screens 35 and 36. The ridge member 40, the end members 41 and 42 and the base member 45 are each provided with flanges indicated generally at 46, against which the frames of the screens 35 or 36 are secured. A rectangular wire ring 47 is forced down over the two screens 45 and 46 after they are placed in position, as shown in Fig. 1. In the form shown, the base member 45 is of the same width as the base member 22 for the outer frame, and the ridge member 40 may be inserted through the slot 44' in the bottom of the member 22 and pushed up into the position shown in Fig. 1, then spring clamps 48 are applied to hold the two skeleton members together.

As shown in Fig. 3, the end surfaces of the outer skeleton frame are provided with screens 50 and 51. These screens may be provided with portable frames, but as their area is comparatively small this detail is immaterial and they may be soldered directly to the members 20 is desired.

When the frames have been assembled with the cover as above described they may be inserted inside of the casing and the cover clamped down by means of the clamp shown in Fig. 2. This clamp comprises a bridge member 52 which extends across the top of the cover with its ends depending there below and turned back so as to receive the flanges 53 formed on the casing. A boss 54 is formed centrally of the bridge and is threaded to receive a clamp screw 55 which is rounded at its lower end so as to seat the socket 56 formed in the top of the cover. Wing flanges 58 permit the screw to be readily tightened or untightened by hand.

A modified form of clamp is shown in Fig. 8. The bridge piece 52' is identical with that described except that it is slotted at 54' to receive a cam or eccentric clamp 55' having an operating handle 56'. The cam 55' is eccentrically pivoted about a pivot pin 57' so that when the handle 56' is pushed down to the position shown in Fig. 8 the cover is securely clamped to the casing. The advantage of this construction is that no twisting force on the pipe line is necessary to unclamp it, as is the case with a screw clamp.

As shown in Fig. 1 the casing is provided with two inlets 60 and 61 in addition to the inlet 12 previously described. For a few simple installations these inlets may be closed by plugs 62. However, it may be desired to use the same filter for two different liquids, and for this purpose a separate pipe may be connected to each of the inlets 60 and 61 in addition to the inlet 12. Then by a simple valve arrangement the filter may be used to filter any one of three different fluids without disconnecting the piping.

However, an important function for the outlet 61 is illustrated by the structure shown in Fig. 6, in which two filters are connected for simultaneous operation. A connecting member 70 is provided with two lateral passages 71 and 72 which connect the outlets 13 and inlets 61 for the two filters. As shown in Fig. 7 the main inlet to the connecting member 70 is through the passage 73, and as shown in Fig. 6 the main outlet is through the passage 74. A single three way valve 75 is provided for both the inlets and the outlets. The upper end of the valve terminates in a squared head 76 by means of which the valve may be turned to any desired position. It will be readily apparent from an inspection of Fig. 7 that by merely turning the valve 75 both of the filters may be simultaneously operated or either of the pair may be cut off. When both filters are in operation the impure oil comes in through the passage 74, divides at the passage 22, a part going to each filter. The purified oil from each filter comes in the passage 71 and is conducted away for use through the passage 73.

The great amount of filtering surface and the proportionately small volume of container will be readily apparent from an inspection of Fig. 1. The impure oil enters at the inlet 12 and flows into the lower chamber 17. Some of the impure oil may pass through the screen 24, but a large part will flow to the bottom of the chamber, and a part of this will flow up through the screen 23. Another quantity of the oil may flow upwardly at the center of the casing through the two screens 35 and 36 into the pure oil chamber 18 and thence through the outlet 13. In addition, the end screens 50 and 51 are also valuable for the filtering operation. By the construction shown all of the screens are inclined so that the surface presented to the impure oil is inclined downwardly. This is of great importance as foreign material will fall off of an inclined surface much more rapidly than it will fall off of a vertical surface and hence the filter is self-cleaning, and the foreign material will deposit as sediment in the bottom of the casing where it can be drained off from the drain cock 15.

An important advantage of this arrangement is that the filtering or screening surfaces as well as the casing may be flushed and thus cleaned without overhauling the filter. By merely opening the drain cock 15, the impure oil and sediment will flow out from the sump chamber 17 as previously described. However, the pure oil from the chamber 18 will then flow back through the filtering or screening surfaces, washing the sediment off therewith, which will also flow out of the drain cock 15. Furthermore, this operation will not seriously interfere with the flow of the oil, as the drain 15 is smaller than the outlet 13.

However, after long periods of operation, particles of foreign matter may clog the screens even when this expedient is used, in which case it is necessary to overhaul the filter for cleaning. To accomplish this it is only necessary to release the clamp 56 or 56', as the case may be, and remove the cover 11. The entire filtering unit being supported therefrom, will come out with the cover 11 when the cover is removed. The sediment may then be cleaned out of the casing by wiping the interior or washing it with a suitable fluid. The filtering unit may be practically cleaned by merely immersing the cover with the entire interior of the unit in a cleaning fluid. However, to completely overhaul the unit shown in Fig. 1, the spring clips 48 may first be removed, releasing the inner skeleton from the outer skeleton. Then by merely driving off the wire rings 47 and 25, all of the portable rectangular screens may be separated and brushed or otherwise cleaned individually. It will therefore be apparent that each portion of the filter is readily accessible for cleaning or overhaul.

While one embodiment has been shown and described in comparative detail, my invention is not limited to the exact construction shown, but includes such modifications as come within the scope of the following claims.

Having thus described the invention what is claimed as new and described to be secured by Letters Patent is:

1. A strainer of the class described, comprising in combination a casing having a detachable cover, a two-part screening element dividing the casing into two chambers communicating only through said screen, an inlet connected to one chamber and an outlet connected to the other, said element being of zigzag cross section, presenting rectangular screening surfaces to the liquid being treated, one part of said element being connected to the cover and detachable therewith for overhaul.

2. A strainer of the class described, comprising in combination a casing, a screening element dividing the casing into two chambers communicating only through said screen, an inlet connected to one chamber and an outlet connected to the other, and additional inlets adapted to be connected to supplies of different liquids and to be selectively placed in communication therewith, whereby different liquids may be filtered without disconnecting any piping.

3. A strainer of the class described, comprising in combination a casing, a screening element dividing the casing into two chambers communicating only through said screen, an inlet connected to one chamber and an outlet connected to the other, and an alternative inlet adjacent said outlet, permitting the filter to be installed in a group for simultaneous or selective operation.

4. A strainer of the class described, comprising in combination a casing, a screening element dividing the casing into two superimposed closed chambers communicating only through said screen, an inlet connected to one chamber and an outlet connected to the other, said element comprising a skeleton frame, detachable rectangular screens positioned on the surfaces thereof, and means for securing said screens in place by wedge action.

5. A strainer of the class described, comprising in combination a casing, a screening element diving the casing into two superimposed chambers communicating only through said screen, an inlet connected to one chamber and an outlet connected to the other, said element comprising a skeleton frame, detachable rectangular screens positioned on the surfaces thereof, and means for securing said screens in place by wedge action, comprising rectangular wire rings.

6. A strainer of the class described, comprising in combination, a casing, a screening element dividing the casing into two chambers communicating only through said screen, an inlet connected to one chamber and an outlet connected to the other, said element comprising an outer frame having rectangular surfaces and trapezoidal ends, and an inner frame having rectangular surfaces and triangular ends.

7. A strainer of the class described, comprising in combination, a casing, a screening element dividing the casing into two chambers communicating only through said screen, an inlet connected to one chamber and an outlet connected to the other, said element comprising an outer frame having rectangular surfaces and trapezoidal ends, and an inner frame having rectangular surfaces and triangular ends, and a cover integral with said outer frame.

8. A strainer of the class described, comprising in combination, a casing, a screening element dividing the casing into two chambers communicating only through said screen, an inlet connected to one chamber and an outlet connected to the other, said element comprising an outer frame having rectangular surfaces and trapezoidal ends, an inner frame having rectangular surfaces and triangular ends, and means for detachably holding said inner frame within said outer frame.

9. A strainer of the class described, comprising in combination, a casing, a screening element dividing the casing into two chambers communicating only through said screen, an inlet connected to one chamber and an outlet connected to the other, said element comprising an outer frame having rectangular surfaces and trapezoidal ends, an inner frame having rectangular surfaces and triangular ends, and detachable screen frame members adapted to fit the filtering surfaces of both frames.

10. A strainer of the class described, comprising in combination, a casing, a screening element dividing the casing into two chambers communicating only through said screen, an inlet connected to one chamber and an outlet connected to the other, said element comprising an outer frame having rectangular surfaces and trapezoidal ends, and an inner frame having rectangular surfaces and triangular ends, and detachable screen frame members adapted to fit the filtering surfaces of both frames, one of the outer screen frame members being provided with an opening adapted to register with the outlet when the unit is assembled, and a spring inside said casing for urging the entire element toward said outlet, to hold the parts snugly in position.

11. A strainer of the class described, comprising in combination, a casing, a screening element dividing the casing into two chambers communicating only through said screen, an inlet connected to one chamber and an outlet connected to the other, said element comprising a pair of downwardly converging rectangular screens, and a pair of upwardly converging rectangular screens joining at their upper ends, and being joined at their lower ends to the lower ends of the first pair, and other screens positioned so as to connect the ends of all four screens.

12. A strainer of the class described, comprising in combination, a substantially rectangular casing having an inlet at one side and an outlet at the other, a cover for said casing, a frame secured to the lower side of the cover and adapted to be suspended therefrom inside the casing, laterally inclined rectangular screens of Monel metal mesh secured to the outer sides of said frame, upwardly and inwardly inclined rectangular screens of Monel metal mesh secured to the said frame inside of the first mentioned screens, and other screens connecting the ends of said first mentioned screens, some of said screens being detachable to facilitate cleaning.

13. A strainer of the class described, comprising in combination a casing portion and a cover portion detachably secured together, a filtering element having angularly disposed rectangular surfaces dividing the casing portion into two chambers communicating only through said element, an inlet connected to one chamber and an outlet connected to the other, said filtering element being supported entirely by one of said portions, whereby it will be removed whenever said portions are separated, permitting cleaning or overhaul.

14. A strainer of the class described, comprising in combination a casing provided with a closure, a screen element supported by said closure and dividing the casing into two chambers communicating only through said screen element, an inlet connected to one chamber and an outlet connected to the other, said element comprising a series of joined rectangular screens having their surfaces downwardly inclined and means for flushing said filter to permit the separated material to gravitate vertically to the bottom of the casing without dissembling the filter.

In testimony whereof I hereunto affix my signature.

RICHARD A. MEYER.